B. M. W. HANSON.
CLUTCH MECHANISM.
APPLICATION FILED APR. 25, 1914.
1,140,326.
Patented May 18, 1915.
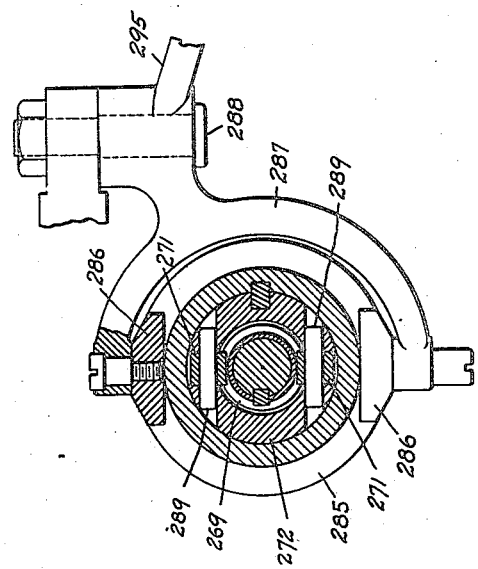
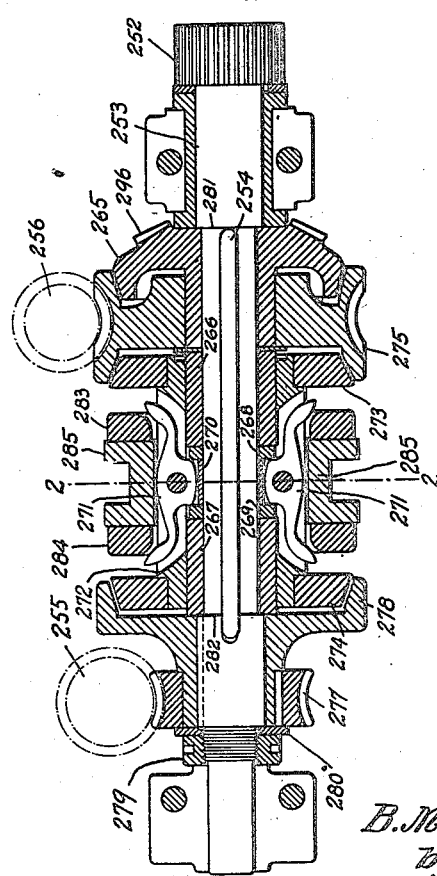
Inventor:
B.M.W. Hanson

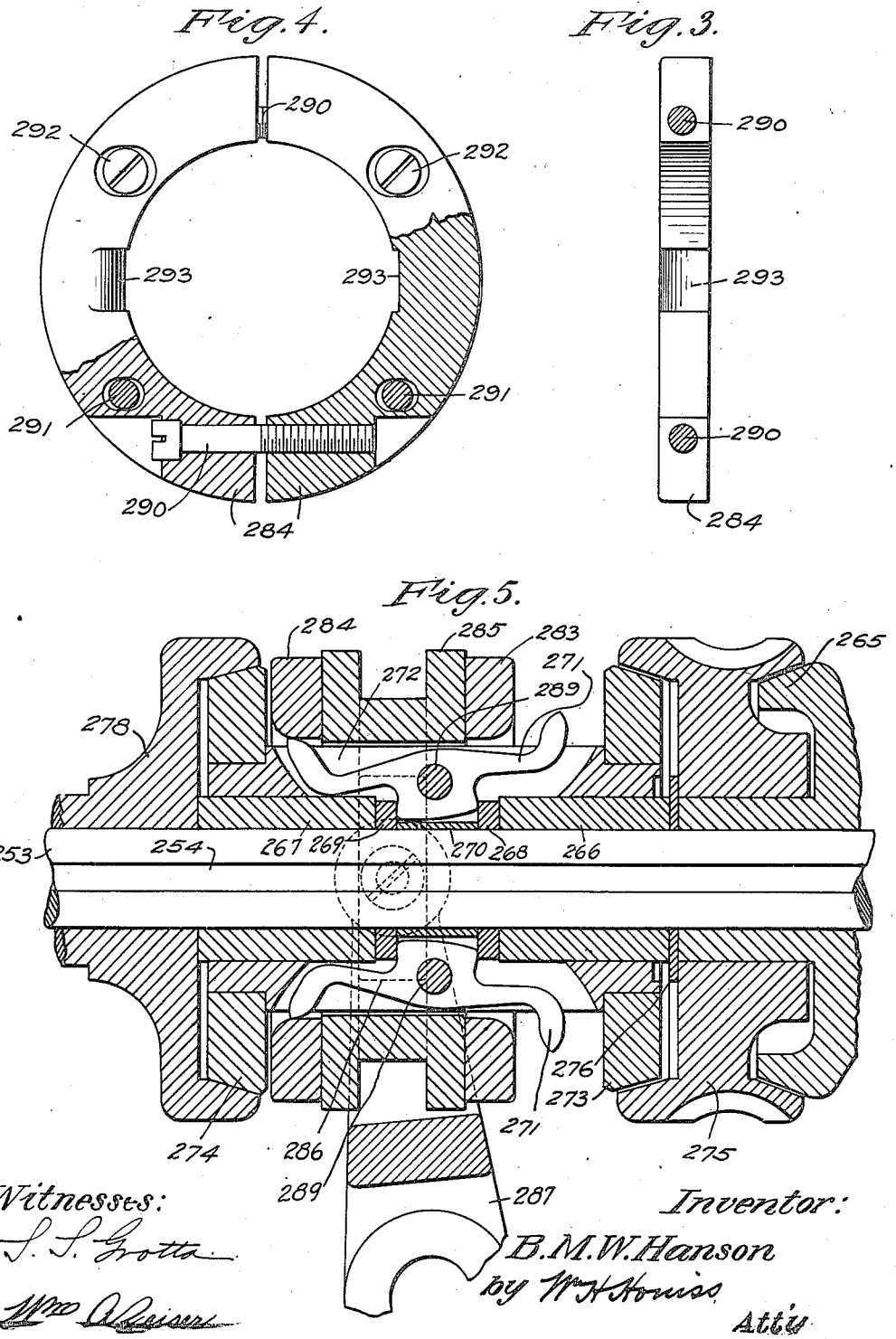

UNITED STATES PATENT OFFICE.

BENGT M. W. HANSON, OF HARTFORD, CONNECTICUT, ASSIGNOR TO PRATT & WHITNEY COMPANY, OF HARTFORD, CONNECTICUT, A CORPORATION OF NEW JERSEY.

CLUTCH MECHANISM.

1,140,326.

Specification of Letters Patent.

Patented May 18, 1915.

Original application filed April 7, 1910, Serial No. 553,965. Divided and this application filed April 25, 1914. Serial No. 834,324.

*To all whom it may concern:*

Be it known that I, BENGT M. W. HANSON, a citizen of the United States, residing at Hartford, in the county of Hartford and State of Connecticut, have invented new and useful Improvements in Clutch Mechanism, of which the following is a specification.

The object of this invention is to provide improved clutch mechanism which will operate smoothly, without cramping or side strain upon itself or its associated mechanism, and with a minimum of frictional resistance.

The invention is herein shown to be embodied in double-acting clutch mechanism, working in both directions, although obviously it is equally applicable to a single clutch device.

Figure 1 of the drawings is a front elevation in section taken through the longitudinal center of the clutch mechanism. Fig. 2 is an end elevation projected from Fig. 1, in section taken on the line 2—2 of that figure. Fig. 3 is a front view in enlarged scale projected from Fig. 4, of the left hand half of the floating collar shown in Fig. 4. Fig. 4 is a side elevation projecting from Fig. 3 showing the collar partly in section. Fig. 5 is a side view in section taken through its longitudinal center, showing the clutch set to drive the shaft at the faster of its two speeds.

This application is a division of my earlier application Serial No. 553,965 filed April 7, 1910.

Keyed upon the shaft 253 by means of the key 254 are the friction disk 265, sleeves 266 and 267, the collars 268 and 269 and the distance or filling piece 270. The collars 268 and 269 are preferably hardened and form abutments for the thrust of the oppositely disposed clutch fingers 271, which are mounted upon pivots 289 in longitudinal slots in the clutch sleeve 272, and provided with inwardly extending projections acting somewhat like large gear teeth between and against the sides of the collars 268 and 269. The clutch sleeve 272 is splined for sliding movement upon the sleeves 266 and 267, and has upon its opposite ends the friction disks 273 and 274. One of the driving members, herein shown as a worm gear 275, driven by the worm 256, rotates constantly between the two friction disks 265 and 273, being preferably mounted on the hub of the disk 265, a collar 276 or equivalent means being employed to prevent endwise movement of the worm gear toward the disk 273, so that when the disk is drawn away from driving engagement with the gear, the latter will not follow the disk. Another driving member, herein shown as a friction disk 278, for driving the disk 274, is mounted to turn loosely upon the shaft 253, and has keyed to it the worm gear 277, which is driven constantly by the worm 255. The friction disk 278 is prevented from endwise movement in one direction by the sleeve 267 and in the other direction by a suitable collar 279, and washer 280 on the shaft 253. By the rocking movement of the clutch fingers 271 toward the right the sleeve 272 is moved endwise in the same direction, so as to grip the gear 275 between the disks 265 and 273, and when the fingers are rocked in the opposite direction the disk 274 is moved into frictional contact with the driving disk 278 as shown in Fig. 1. The thrust of the clutch fingers is taken by one or the other of the collars 268 and 269, which in turn are supported by the sleeves intervening between those collars and the shoulders 281 and 282. This rocking movement of the clutch fingers is imparted by collars 283 and 284, which are shown in detail in Figs. 3 and 4, and are loosely secured to the sides of the clutch collar 285, which is grooved to receive suitable shoes 286 carried by the clutch yoke 287, which is pivotally mounted upon the stud 288 supported by the bed or frame.

The collars 283 and 284, as shown in Figs. 3 and 4, are each made in two halves, which are adjustably secured together by screws 290, and each half is loosely attached to the side of the clutch collar 285 by means of guiding pins 291 and screws 292, so that each collar instead of being held in exact concentric relation to the clutch collar 285 and the shaft 253, is free to "float" with the clutch fingers slightly out of their central position, to accommodate variations that in practice are liable to occur either initially or as a result of wear, in the clutch fingers or their connections. This provision enables the collars 283 and 284 as they are pushed endwise by the clutch collar 285 to distribute its pressure equally upon the ends of the clutch fingers 271, thus distributing the strains equally, avoiding cramping action, and conducing to smooth and balanced movement of the parts during the clutching operations in either direction. This construction and arrangement enables the collars to be easily and accurately adjusted independently of each other to take up the wear of the clutch, the adjustment being automatically distributed by each float ring, so as to bring the added or altered pressure equally upon its two clutch fingers without any attention to that end on the part of the adjuster. Thus a suitable gripping friction for the disk 273 is obtained by adjusting the collar 283, and for the disk 274 by adjusting the collar 284. This adjustment of the collars is effected by drawing their two halves together by means of the screws 290, checking them at their set position in any convenient way. The floating collars are preferably flattened at 293 for receiving the ends of the fingers 271, thus providing for good working contact and aiding to maintain the collars in proper register with the rings, and also keeping the direction of adjustment of those collars coincident with the direction of the swinging movement of the fingers. The clutch yoke 287 is shown to be provided with an arm 295, which may be operated at the required times, and in the required direction either by hand, or by a cam or other suitable driving connection from any machine upon or with which this clutch mechanism may be employed.

The collars 283—284, although adjustable, operate when adjusted as unitary members, which are unyielding in themselves, and thus, although floating with the positions of their respective pairs of clutch fingers, form rigid operating connections between those fingers.

The gears 275 and 277 may be driven in the same direction at different speeds, or in opposite directions either at different speeds or at the same speed. Ordinary spur gearing may obviously be employed instead of worm gearing, and these may be the driven members, employing the shaft 253 as the driving member, without otherwise changing the mechanism herein described. Any suitable means, such as a gear 252 may be employed for transmitting rotary movements to or from the shaft 253.

I claim as my invention:—

1. The combination, in clutch mechanism, of a plurality of clutch operating fingers, and means for operating the said fingers with equal pressure, including an unyielding unitary floating member appurtenant to the finger operating means.

2. The combination, in clutch mechanism, of a plurality of clutch operating fingers, means for operating the said fingers, including an unyielding unitary floating member loosely appurtenant to the operating means, and engaging with the fingers to equalize the operating pressure between the said fingers.

3. The combination, in clutch mechanism, of a plurality of clutch operating fingers, means for operating the said fingers, including a floating member loosely appurtenant to the operating means, and engaging with the said fingers to equalize the pressure upon the fingers, and means for adjusting the said floating member to vary its pressure on the fingers.

4. The combination, in clutch mechanism, of a plurality of clutch operating fingers and means for operating the fingers, including a loosely connected floating member engaging with the fingers to equalize the pressure thereon, and means for adjusting the finger engaging portions of the said floating member toward and from each other to vary the pressure on the fingers.

5. The combination, in clutch mechanism, of oppositely disposed clutch operating fingers, and means for operating the said fingers, including a loosely connected floating member having oppositely disposed portions engaging with the fingers, and means for adjusting the said engaging portions of the floating member toward and from each other to vary the pressure upon the fingers.

6. The combination, in clutch mechanism, of a plurality of clutch operating fingers, and means for operating the said fingers with equal pressure, including an annular finger-engaging member loosely appurtenant to the operating means.

7. The combination, in clutch mechanism, of a plurality of clutch operating fingers, means for operating the said fingers with equal pressure, including an annular flange engaging member loosely appurtenant to the operating means, and means for adjusting the finger engaging portions of the said annular member toward and from each other to vary the operating pressure upon the fingers.

8. The combination, in clutch mechanism, of oppositely disposed clutch operating fingers, means for operating the said fingers with equal pressure, including a ring loosely appurtenant to the clutch operating means, and means for contracting and expanding the said ring to vary the operating pressure on the said fingers.

9. The combination, in clutch mechanism, of oppositely disposed clutch operating fingers, and means for operating the said fingers with equal pressure, including a two part ring loosely appurtenant to the operating means.

10. The combination, in clutch mechanism, of a plurality of clutch operating fingers, and means for operating the said fingers with equal pressure upon each, including a clutch collar and an annular ring loosely appurtenant to the said collar, and bearing against the said fingers.

11. The combination, in clutch mechanism, of a plurality of clutch operating fingers, and means for operating the said fingers with equal pressure upon each, including a clutch collar and an annular ring loosely appurtenant to the said collar, and bearing against the said fingers, and means for contracting and expanding the said ring to increase and diminish the pressure upon the fingers.

12. The combination, in clutch mechanism, of oppositely disposed clutch operating fingers, means for operating the said fingers with equal pressure upon each, including a clutch collar and a two-part ring loosely appurtenant to the collar with the two parts bearing against the respective rings, and means for adjusting the said two parts of the ring toward and from each other to increase and diminish their operating pressure upon the fingers.

13. The combination, in clutch mechanism, of oppositely disposed clutch operating fingers, means for operating the said fingers with equal pressure, including a clutch collar, a two-part ring loosely appurtenant to the collar and engaging with the fingers, means for maintaining the two parts of the ring in engaging relation to the fingers, and means for adjusting the two-parts toward and from each other to vary their pressure upon the fingers.

14. The combination, in clutch mechanism, of a pair of oppositely disposed clutch operating levers, each provided with two oppositely disposed fingers, and means for operating the said levers in opposite directions, including a sliding clutch collar, a two-part ring loosely appurtenant to each side of the collar, each ring engaging with the oppositely disposed fingers of the pair of levers, and means for independently adjusting the two parts of each ring toward and from each other to vary their pressure on the respective pairs of fingers.

In testimony whereof I have signed my name to this specification in the presence of two subscribing witnesses this 21st day of April, 1914.

BENGT M. W. HANSON.

Witnesses:
KATHRYN T. M. O'CONNELL,
CAROLINE M. BRECKLE.